United States Patent
Lin et al.

(10) Patent No.: US 12,509,414 B2
(45) Date of Patent: Dec. 30, 2025

(54) CARBON QUANTUM DOT, A COMPOSITION THEREOF AND A METHOD FOR TREATING INFECTION BY USING SAME

(71) Applicant: NATIONAL TAIWAN OCEAN UNIVERSITY, Keelung (TW)

(72) Inventors: HanJia Lin, Keelung (TW); ChihChing Huang, Keelung (TW); HanYou Lin, Keelung (TW); PeiXin Lai, Keelung (TW); Fan Shen, Keelung (TW); YuJu Chen, Keelung (TW); WanChing Kuo, Keelung (TW)

(73) Assignee: NATIONAL TAIWAN OCEAN UNIVERSITY, Keetung (TW)

( * ) Notice: Subject to any disclaimer, the term of this patent is extended or adjusted under 35 U.S.C. 154(b) by 1022 days.

(21) Appl. No.: 17/601,150

(22) PCT Filed: Apr. 4, 2019

(86) PCT No.: PCT/CN2019/081540
§ 371 (c)(1),
(2) Date: Oct. 4, 2021

(87) PCT Pub. No.: WO2020/199202
PCT Pub. Date: Oct. 8, 2020

(65) Prior Publication Data
US 2022/0177412 A1   Jun. 9, 2022

(51) Int. Cl.
| | | |
|---|---|---|
| C07C 211/15 | (2006.01) |
| A61P 31/04 | (2006.01) |
| C07C 209/68 | (2006.01) |
| C07C 227/16 | (2006.01) |
| C07C 229/26 | (2006.01) |
| C07C 319/20 | (2006.01) |
| C07C 323/25 | (2006.01) |
| C09K 11/06 | (2006.01) |

(52) U.S. Cl.
CPC ............ *C07C 211/15* (2013.01); *A61P 31/04* (2018.01); *C07C 209/68* (2013.01); *C07C 227/16* (2013.01); *C07C 229/26* (2013.01); *C07C 319/20* (2013.01); *C07C 323/25* (2013.01); *C09K 11/06* (2013.01)

(58) Field of Classification Search
CPC ... C07C 209/68; C07C 227/16; C07C 229/26; C07C 211/15; C07C 323/25; C07C 319/23; A61K 33/44; A61K 9/50; B82Y 30/00
USPC ............................................ 252/502, 182.15
See application file for complete search history.

(56) References Cited

U.S. PATENT DOCUMENTS

2017/0274005 A1   9/2017   Hahn et al.

FOREIGN PATENT DOCUMENTS

| | | | | |
|---|---|---|---|---|
| CN | 103183330 | 7/2013 | | |
| CN | 103923647 | 7/2014 | | |
| CN | 104140084 | 11/2014 | | |
| CN | 104357047 | 2/2015 | | |
| CN | 105036111 | 11/2015 | | |
| CN | 105754593 | 7/2016 | | |
| CN | 105819433 | 8/2016 | | |
| CN | 106634979 | 5/2017 | | |
| CN | 106653261 | 5/2017 | | |
| CN | 107219204 | 9/2017 | | |
| CN | 107376967 | 11/2017 | | |
| CN | 107397958 | 11/2017 | | |
| CN | 104721841 | 1/2018 | | |
| CN | 107626258 | 1/2018 | | |
| CN | 107815310 | 3/2018 | | |
| CN | 107934936 | 4/2018 | | |
| CN | 108051490 | 5/2018 | | |
| CN | 109476991 | 3/2019 | | |
| KR | 10-1607575 | 4/2016 | | |
| KR | 101663748 B1 | * 10/2016 | ............ | C09K 11/65 |
| KR | 10-2018-0024363 | 3/2018 | | |
| WO | WO-2018010177 A1 | * 1/2018 | ......... | A61K 47/6923 |

OTHER PUBLICATIONS

Chu "Pulse laser-induced fragmentation of carbon quantum dots: a structural analysis." Nanoscale, 2017,9, 18359-18367 (Year: 2017).*
Dong "Blue luminescent graphene quantum dots and graphene oxide prepared by tuning the carbonization degree of citric acid." Carbon vol. 50, Issue 12, Oct. 2012, pp. 4738-4743 (Year: 2012).*
Translation of KR-101663748-B1 (Year: 2016).*
International Search Report and Written Opinion for International Application No. PCT/CN2019/081540 mailed on Dec. 27, 2019, 11 pages.
Anand, et al. "Graphene oxide and carbon dots as broad-spectrum anitmicrobial agents—a minireview", Nanoscale Horizons, Published Sep. 5, 2018.
Li, et al. "Synthesis of Self-Assembled Spermidine-Carbon Quantum Dots Effective against Multidrug-Resistant Bacteria", Material Views, Advanced Healthcare Materials, 2016.
Jian, et al. "Super-Cationic Carbon Quantum Dots Synthesized from Spermidine as an Eye Drop Formulation for Topical Treatment of Bacterial Keratitis", ACS Nano 2017, pp. 6703-6716.
Lai, et al. "Solid-state synthesis of self-functional carbon quantum dots for detection of bacteria and tumor cells", Sensors and Actuators B 228, 2016, pp. 465-470.

* cited by examiner

*Primary Examiner* — Tri V Nguyen

(74) *Attorney, Agent, or Firm* — Amin, Turocy & Watson, LLP

(57) ABSTRACT

Provided is a carbon quantum dot having a graphite core and a surface including components, such as compounds derived from formula (I) and halogens, and having a positive charge for antibacterial purposes. Also provided are methods for preparing a carbon quantum dot and a composition containing the same.

16 Claims, 8 Drawing Sheets

CARBON QUANTUM DOT, A COMPOSITION THEREOF AND A METHOD FOR TREATING INFECTION BY USING SAME

TECHNICAL FIELD

The present disclosure relates to the field of a carbon quantum dot (abbreviated as CQD), and particularly, relates to a composition comprising a carbon quantum dot. The carbon quantum dot of the present disclosure has a graphite core and a surface comprising a compound derived from formula (I) and a halogen-containing component. The carbon quantum dot is one with a positive charge on the surface and used for antibacterial purposes. The present disclosure also relates to methods for preparing carbon quantum dots and the compositions thereof.

BACKGROUND

Nanomaterials with antimicrobial properties can inhibit the growths of microorganisms and destroy the microorganisms through a mechanism different from traditional antibiotic drugs. Most of the currently known antibacterial nanomaterials are derived from metals or metal oxides, for example, silver nanoparticles. The antibacterial mechanism of silver nanoparticles that is currently understood is through the release of $Ag^+$ to destroy cell membranes, interfere with the electron transport chain, and cause DNA damages. Copper nanoparticles can cause protein inactivation and release free $Cu^{2+}$ to generate reactive oxygen species (ROS) to destroy the amino acid and DNA synthesis in cells. Titanium dioxide nanoparticles can also generate ROS and cause damages to cell membranes and cell walls. In addition, zinc oxide nanoparticles can disrupt their physiological functions by interacting with lipids and proteins on cell membranes. The above-mentioned antibacterial metal or metal oxide nanoparticles have been used broadly in antibacterial agents, and their multiple antibacterial mechanisms have greatly reduced the possibility of bacteria to develop drug resistance. However, many antibacterial metal and metal oxide nanoparticles are more toxic to most human cells that limits their uses. In the face of current prevalence of drug-resistant bacteria, traditional antibiotics have gradually become ineffective, and antibacterial metals and metal oxides have their limitations. Therefore, there is a need for new antibacterial materials that are more effective and safer, and can be used to treat infections.

Carbon quantum dots are a new type of fluorescent nanomaterial, which has the characteristics of high quantum yield (QY), photo stability, tunable excitation and radioactivity, low toxicity and high biocompatibility, and is an emerging material that has attracted much attention. Although the core components of carbon quantum dots are mostly carbon elements, the results of many documents show that as long as the precursor materials for preparing carbon quantum dots, the processing methods, or the processing conditions are different, the structure of the final output quantum dots and the characteristics thereof will be different (Nanoscale Horiz. 2019, 4, 117-137). For example, Y. J. Li et al. used spermidine and spermine, which are both polyamines, to modify carbon quantum dots derived from ammonium citrate with the same processing method, but the antibacterial activities of the final carbon quantum dot derivatives produced vary significantly (Adv. Healthc. Mater. 2016, 19, 2545-2554). This shows that the structures and properties of the resultant carbon quantum dots cannot be predicted even from the structurally similar precursors of compounds. As shown in the study of H. J. Jian et al., the carbon quantum dots are made with spermidine or other polyamines as precursors by using different processing conditions would have different structures, properties, and functions (ACS Nano, 2017, 11, 6703-6716).

At present, the application of carbon quantum dots mainly lies in the use of their fluorescent properties as developers or probes. For example, it has been reported to remodify and bind folate molecules on carbon quantum dots to distinguish cancer cells from normal cells, because many cancer cells have a large number of folate receptors on the cell surface (J. Mater. Chem. 2012, 22, 12568-12573). It is also reported that the use of ammonium citrate as a carbon source to make carbon quantum dots and then the use of mannose to modify the carbon quantum dots can produce fluorescent probes that can selectively label *Escherichia coli*. The fluorescent probes are capable of performing bioimaging analyses (Sens. Actuators. B 2016, 228, 465-470). Carbon quantum dots can also be used as detection probes. In the past, data have shown that citric acid and diethylenetriamine can be used as raw materials, processed by a hydrothermal method, and then functionalized with bromine acetyl to obtain functionalized carbon quantum dots. Such materials are used in the detection of glutathione (CN107219204A, 2017). Another method for preparing a carbon quantum dot embedded with an anticancer drug has been disclosed. This method first prepares synthetic carbon quantum dots through the reaction of a mixture of citric acid, concentrated sulfuric acid and concentrated nitric acid, so that it can be attached to the anticancer drug, Sorafenib, to obtain drug-loaded carbon quantum dots for use in bioimaging and treatment of cancer cells (CN107397958A, 2017). In addition, there are also technologies that use glucose and glycine as carbon precursors and nitrogen precursors to synthesize nitrogen-containing carbon quantum dots by high-speed ball milling, and then use a hydrothermal method to prepare graphite-phase vaporized carbon to prepare nitrogen-containing carbon quantum dots/graphite-phase carbon nitride composite photocatalyst (CN107376967A, 2017). In addition, there is also a document that mentions a one-step method of adding octadecylamine to octadecene, and then reacting with a citric acid to obtain nitrogen-doped carbon quantum dots with a nitrogen content of 2.56 to 4.2%. Among them, the nitrogen-doped carbon quantum dots not only have adjustable luminescence, but also have regular changes in particle size. The carbon quantum dots have features such as non-toxic, easy to functionalize, high fluorescence intensity and stability, and fine size controllability and are used in bioimaging, sensing and probe technologies, as well as photovoltaic devices such as solar cells, light-emitting devices, and field-effect transistors (CN104357047A, 2014). Iodine is combined with glycine to form carbon quantum dots with stable fluorescence performance, high efficiency X-ray attenuation ability, and good biocompatibility by a one-step hydrothermal carbonization method (CN104721841B, 2015). It has also been reported that by using amino sugar hydrochloride as a raw material, the preparation of chlorine-containing carbon quantum dots by the hydrothermal method has stable fluorescence and low toxicity. It can be applied to the detection of trivalent iron ions, and it also has possible effects when used in fluorescent inks and sewage treatment (CN107815310A, 2018). The carbon quantum dots with sugar alcohols are combined with chlorine. Through passivation, amine compounds are formed on the surfaces of the carbon quantum dots (KR1607575B1, 2014). There is also a research on the use of a mixture of compounds, nitrogen precursors and halide precursors to prepare graphene quantum dots by a hydrothermal reaction (KR2018024363A, 2016); or a research on a heat treatment with triethylenediamine mixed with an organic acid for a biomarker (CN106634979, 2016); or a discussion on mixing ethylenediamine with water-soluble carbohydrates and chloride ions by chemical reactions for use in biomarkers, carriers, and the detection of metal ion concentrations (CN105754593, 2016); or a patent of carbon quantum dots prepared by lysine, serine, mixed xylitol and fluorine or chlorine, and subjecting to a microwave treatment, to be used as a magnetic material, a photocatalyst, etc. (CN106653261, 2016); or a report on carbon quantum dots capable of being made by a chemical reaction using L-lysine mixed with graphene and fluorine, which can be used as a sensor (CN108051490A, 2017), etc. There are also discussions on the production of carbon quantum dots by a hydrothermal method after mixing diamines containing primary and tertiary amines with citric acid (CN107626258A, 2017). The production of carbon quantum dots includes mixing citric acid with amino acids and undergoing pyrolysis, or the method of producing carbon quantum dots by a hydrothermal method with 1-(3-dimethylaminopropyl)-3-ethylcarbodiimide hydrochloride (CN105819433A, 2016), etc. The above technologies have shown that the uses of the carbon quantum dots are extremely broad, but the above are all not used in the field of antibacterial and have complicated manufacturing processes.

Polyamines are small molecules composed of two or more amino groups, which are widely present in foods and organisms. Most of the polyamines in organisms are metabolized from amino acids, so that they can also be regarded as derivatives of amino acids. However, the positive charge characteristics of polyamines are important features of their functions. Diamines, such as putrescine, are often the starting materials for the synthesis of polyamines, and can be further synthesized into higher-order triamines, tetraamines (such as spermidine and spermine) or the other polyamines. For many cells, the presence of polyamines is important. For example, it has been pointed out in the documents that positively charged properties of polyamines enable them to play a role in physiological functions such as the stabilization of DNA, regulation of ion channel functions, regulation of gene transcription and gene translation, and impact on cell growth and cell proliferation. The concentration of polyamines in cells can be as high as in the millimolar concentration range. At this concentration, it has also been reported that polyamines have the effect of inhibiting the growth of bacteria (ACS Infect. Dis. 2017, 3, 777-779).

In the research of antibacterial carbon quantum dots, Y. J. Li et al. modified biologically derived polyamines such as spermidine on the surface of carbon quantum dots to produce carbon quantum dots with antibacterial abilities (Adv. Healthc. Mater. 2016, 19, 2545-2554). H. J. Jian et al. directly used polyamine molecules as carbon precursors and nitrogen precursors to produce carbon quantum dots with polyamine structures on the surface by a one-step pyrolysis method (ACS Nano, 2017, 11, 6703-6716). These studies have pointed out that, because polyamines are natural compounds with positive charges, these carbon quantum dots with polyamine structures on the surfaces have multivalent positive charges, which can increase contact with and interact with bacterial cell surfaces. This directly causes the destruction of the bacterial cell membrane, leading to the death of the bacteria. In addition, polyamine carbon quantum dots can also inhibit bacterial activity by interacting with proteins, DNA, RNA and other molecules in the cell.

Although the above-mentioned prior arts have proposed to prepare various carbon quantum dots and their uses with different precursors and different methods, most of them are applied to fluorescent labels. Researches on carbon quantum dots for antibacterial purposes are relatively few. The latest review by A. Anand et al. pointed out that for different precursors, different processing methods and different processing conditions, the antibacterial properties of manufactured carbon quantum dots in different sizes and structures will vary (Nanoscale Horiz. 2019, 4, 117-137).

As the above background illustrates, although there are many relevant researches on carbon quantum dots, most of them are not in the antibacterial field. In addition, past studies usually describe only the precursors and synthesis methods of preparing carbon quantum dots, but the detailed composition and structural characteristics, especially the surface functional groups and elemental composition of the final produced carbon quantum dots are often not further identified or defined. Therefore, the current information is still unable to establish the correlation between the characteristics and the antibacterial ability of carbon quantum dots. Therefore, it is impossible to directly infer from the previous research on the kind of precursors and the kind of processes to prepare the carbon quantum dots with antibacterial effects.

In addition, although there have been few reports on antibacterial carbon quantum dots, the antibacterial effects of these materials still need to be further improved. For example, the antibacterial ability of antibacterial carbon quantum dots previously reported is easily affected by salt, which will make carbon quantum dots to be less effective in seawater environments (Nanoscale Horiz. 2019, 4, 117-137). In addition, the current carbon quantum dots are mainly used against bacteria. In the future, it is still necessary to be able to more diversifiably inhibit microorganisms including fungi (ACS Nano, 2017, 11, 6703-6716). Of course, the safety of carbon quantum dots is also an issue. If the effect of treating microbial infections can be achieved under the premise of animal safety, it will be a great progress in related fields.

SUMMARY

The present disclosure provides a carbon quantum dot, which comprises a reaction product derived from a compound of formula (I) and a halide compound after a pyrolysis treatment:

(I)

wherein the reaction product comprises a graphite core, the compound of formula (I) and a halogen on and/or above the surface of the graphite core, and the surface has a positive charge.

Based on the above disclosure, in the compound of formula (I), $R_1$ is selected from $C_2$-$C_8$ alkyl, $C_7$ alkylamine, $C_{10}$ alkyl polyamine, 2-pentanol group and diethyl sulfide group, and $R_2$ is selected from H and carboxyl.

Based on the above disclosure, the halogen is derived from a chlorine compound, a bromine compound, or an iodine compound.

Based on the above disclosure, the chlorine compound is selected from the group consisting of hydrogen chloride, ammonium chloride, hypochlorous acid, potassium chloride and sodium chloride.

Based on the above disclosure, the bromine compound is hydrogen bromide or potassium bromide.

Based on the above disclosure, the iodine compound is hydrogen iodide or potassium iodide.

The present disclosure also provides a method for preparing carbon quantum dots and a composition thereof, the method comprising: mixing a compound of formula (I):

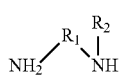
(I)

with a halide ion compound to form a precursor; and pyrolyzing the precursor at a temperature to obtain the carbon quantum dot.

Based on the above disclosure, the temperature of heat treatment is between 150° C. and 300° C.

Based on the above disclosure, the temperature of the heat treatment is between 150° C. and 180° C., or between 180° C. and 210° C., or between 210° C. and 240° C., or between 240° C. and 270° C., or between 270° C. and 300° C.

Based on the above disclosure, in the compound of formula (I), $R_1$ is selected from the group consisting of $C_2$-$C_8$ alkyl, $C_7$ alkylamine, $C_{10}$ alkyl polyamine, 2-pentanol group and diethyl sulfide group, and $R_2$ is selected from the group consisting of H and carboxyl.

Based on the above disclosure, the halide ion compound is derived from a chloride compound, a bromine compound, or an iodine compound.

Based on the above disclosure, the chlorine compound is hydrogen chloride, ammonium chloride, hypochlorous acid, potassium chloride or sodium chloride.

Based on the above disclosure, the bromine compound is hydrogen bromide or potassium bromide.

Based on the above disclosure, the iodine compound is hydrogen iodide or potassium iodide.

Based on the above disclosure, the temperature is between 150° C. and 300° C.

Based on the above disclosure, the temperature is between 150° C. and 180° C., or between 180° C. and 210° C., or between 210° C. and 240° C., or between 240° C. and 270° C. or between 270° C. and 300° C.

The present disclosure provides a carbon quantum dot, which is a reaction product of a compound of formula (I) mixed with a halide ion compound and pyrolyzed at a temperature:

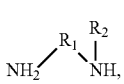
(I)

wherein $R_1$ is selected from $C_2$-$C_8$ alkyl, $C_7$ alkylamine, $C_{10}$ alkyl polyamine, 2-pentanol group and diethyl sulfide group, and $R_2$ is selected from H and carboxyl group.

Based on the above conception, the halide ion is derived from a chloride compound, a bromine compound, and an iodine compound.

Based on the above conception, wherein the chlorine compound comprises hydrogen chloride, ammonium chloride, hypochlorous acid, potassium chloride or sodium chloride.

Based on the above conception, wherein the bromine compound comprises hydrogen bromide or potassium bromide.

Based on the above conception, wherein the iodine compound comprises hydrogen iodide or potassium iodide.

Based on the above conception, the temperature is between 150 to 300° C.

Based on the above conception, the temperature is between 150 to 180° C., or 180 to 210° C., or 210 to 240° C., or 240 to 270° C. or 270 to 300° C.

Based on the above conception, the weight percentage of halogen in the carbon quantum dot composition is between 15% to 40%.

The present disclosure provides an antibacterial composition, which comprises an effective dose of the carbon quantum dots described above.

The present disclosure provides a method for preparing an antibacterial composition, which comprises further adding a carbon quantum dot to a composition comprising at least one pharmaceutically acceptable carrier according to the method described above.

The present disclosure provides a use of a carbon quantum dot in the preparation of a medicament for treating an infection condition or a disease, wherein the carbon quantum dot is a reaction product of a compound of formula (I) mixed with a halide ion and then pyrolyzed at a temperature:

(I)

wherein $R_1$ is selected from the group consisting of $C_2$-$C_8$ alkyl, $C_7$ alkylamine, $C_{10}$ alkyl polyamine, 2-pentanol group and diethyl sulfide group, and $R_2$ is selected from the group consisting of H and carboxyl group.

Based on the above disclosure, the halide ion compound is derived from a chloride compound, a bromine compound, or an iodine compound.

Based on the above disclosure, the chlorine compound is hydrogen chloride, ammonium chloride, hypochlorous acid, potassium chloride or sodium chloride.

Based on the above disclosure, the bromine compound is hydrogen bromide or potassium bromide.

Based on the above disclosure, the iodine compound is hydrogen iodide or potassium iodide.

Based on the above disclosure, the temperature is between 150° C. and 300° C.

Based on the above disclosure, the temperature is between 150° C. and 180° C., or between 180° C. and 210° C., or between 210° C. and 240° C., or between 240° C. and 270° C. or between 270° C. and 300° C.

Based on the above disclosure, the weight percentage of halogen in the carbon quantum dot composition is between 15% and 40%.

Based on the above disclosure, the infective condition or disease is caused by the proliferation of a microorganism, and the microorganism is selected from the group consisting of a non-multidrug resistant bacterium, a drug resistant and a multidrug resistant bacterium.

Based on the above disclosure, the non-multidrug resistant bacterium is selected from the group consisting of

*Escherichia coli, Pseudomonas aeruginosa, Salmonella enterica, Staphylococcus aureus, Streptococcus iniae*, and *Candida albicans*. The multidrug resistant bacterium is drug-resistant *Staphylococcus*.

BRIEF DESCRIPTIONS OF THE DRAWINGS

In FIG. 8, 1 represents a halogen compound; 2 represents a compound of formula (I); 3 represents a positive charge; and 4 represents graphite core.

DETAILED DESCRIPTION OF THE EMBODIMENTS

Figure 1:
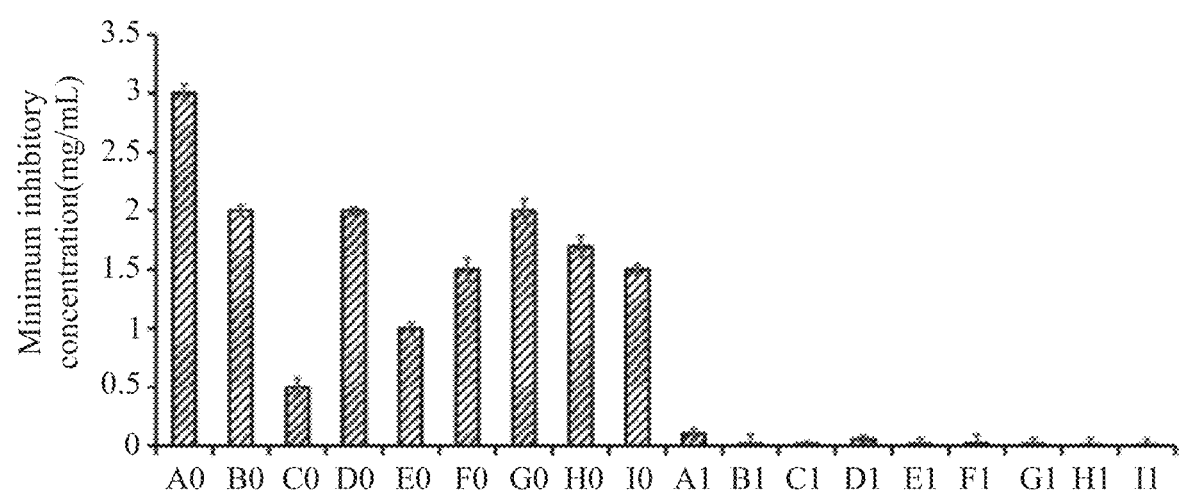
FIG. 1 shows the differences in the antibacterial effects of the carbon quantum dots (CQDs) compound of formula (I) and the chlorine-containing carbon quantum dot derivatives thereof.

1. Carbon Quantum Dot (CQD) Synthesis Method

A variety of polyamines and polyamine derivatives with the structural characteristics of the compound of formula (I) (as shown in Table 1 below) were mixed with halogen-containing compounds (as shown in Table 2 below) as precursors, and subject to pyrolysis (as described in the experimental method in Taiwan Patent No. 1648003, with different high temperature combinations) to form carbon quantum dots. After the obtained solid was naturally cooled to room temperature, deionized water was added thereto. The mixture was ultra-sonicated for 1 hour, and then centrifuged using a high-speed centrifuge at a relative centrifugal force (RCF) of 500×g for purification, and then the supernatant was taken out. The supernatant was purified by dialysis and then freeze-dried into carbon quantum dots. The detailed structural and compositional analysis methods of carbon quantum dots include: nanometer particle size and interface potential measuring instrument, element analyzer, inductively coupled plasma mass spectrometer, high resolution electron microscope, and laser desorption/ionization mass spectrometry.

TABLE 1

Compounds of Formula (I)

| No. | Name | Structure | Chemical formula (I) $NH_2\diagup^{R_1}\diagdown_{NH}^{\overset{R_2}{\vert}}$ |
|---|---|---|---|
| A | 1,2-diamino-ethane | 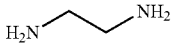 | $R_1 = [CH_2]_2$<br>$R_2 = H$ |
| B | 1,4-diamino-butane | 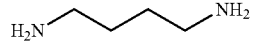 | $R_1 = [CH_2]_4$<br>$R_2 = H$ |
| C | 1,6-diamino-hexane | 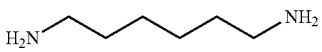 | $R_1 = [CH_2]_6$<br>$R_2 = H$ |
| D | 1,8-diamino-octane |  | $R_1 = [CH_2]_8$<br>$R_2 = H$ |
| E | spermidine |  | $R_1 = [CH_2]_4-NH-[CH_2]_3$<br>$R_2 = H$ |
| F | spermine | 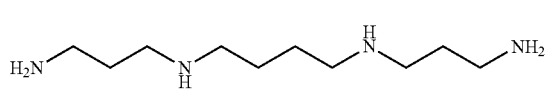 | $R1 = [CH_2]_3-NH-[CH_2]_4-NH-[CH_2]_3$<br>$R2 = H$ |
| G | 2,6-diamino-hexanoic acid | 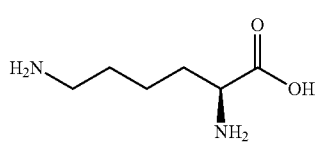 | $R1 = [CH_2]_4-CH-COOH$<br>$R2 = H$ |

TABLE 1-continued

Compounds of Formula (I)

Chemical formula (I)

$$NH_2 \diagup R_1 \diagdown \underset{\underset{NH}{|}}{\overset{R_2}{}}$$

| No. | Name | Structure | |
|---|---|---|---|
| H | 2,6-diamino-5-hydroxy-hexanoic acid | (structure shown) | $R_1 = CH_2—CHOH—[CH_2]_2—CH—COOH$<br>$R_2 = H$ |
| I | 2-amino-3-(2-amino-ethylsulfanyl)-propionic acid | (structure shown) | $R_1 = [CH_2]_2—S—CH_2—CH—COOH$<br>$R_2 = H$ |

TABLE 2

Halogen-containing compounds

| No. | Name of halogen-containing compound | Type of halogens added |
|---|---|---|
| 0 | No addition | No addition |
| 1 | Hydrogen chloride (HCl) | Chlorine (Cl) |
| 2 | Ammonium chloride (NH$_4$Cl) | |
| 3 | Hypochlorous acid (HClO) | |
| 4 | Potassium chloride (KCl) | |
| 5 | Sodium chloride (NaCl) | |
| 6 | Hydrogen bromide (HBr) | Bromine (Br) |
| 7 | Potassium bromide (KBr) | |
| 8 | Hydrogen iodide (HI) | Iodine (I) |
| 9 | Potassium iodide (KI) | |

In some embodiments, the compounds of formula (I) shown in Table 1 and the halogen-containing compounds shown in Table 2 were used as precursors, and a pyrolysis process was performed at the following temperature to produce various carbon quantum dots:

TABLE 3

Precursor composition and pyrolysis temperature of various carbon quantum dots in the examples

| Code of Carbon Quantum Dot | Precursor of Compound of Formula (I) | Precursor of Halogen-containing compound | Temperature of pyrolysis (° C.) |
|---|---|---|---|
| A0 | 1,2-diaminoethane | — | 270 |
| B0 | 1,4-diaminobutane | — | 270 |
| C0 | 1,6-diaminohexane | — | 270 |
| D0 | 1,8-diaminooctane | — | 240 |
| E0 | spermidine | — | 270 |
| F0 | spermine | — | 270 |
| G0 | 2,6-diaminohexanoic acid | — | 280 |
| H0 | 2,6-diamino-5-hydroxyhexanoic acid | — | 280 |
| I0 | 2-amino-3-(2-amino-ethylsulfanyl)-propionic acid | — | 280 |
| A1 | 1,2-diaminoethane | HCl | 270 |
| B1 | 1,4-diaminobutane | HCl | 270 |
| C1 | 1,6-diaminohexane | HCl | 270 |
| D1 | 1,8-diaminooctane | HCl | 240 |
| E1 | spermidine | HCl | 270 |
| F1 | spermine | HCl | 270 |
| G1 | 2,6-diaminohexanoic acid | HCl | 280 |
| H1 | 2,6-diamino-5-hydroxyhexanoic acid | HCl | 280 |
| I1 | 2-amino-3-(2-amino-ethylsulfanyl)-propionic acid | HCl | 280 |
| C1-0.5 | 1,6-diaminohexane | 0.5X HCl | 270 |
| C1-2 | 1,6-diaminohexane | 2X HCl | 270 |
| C1-4 | 1,6-diaminohexane | 4X HCl | 270 |
| C1-6 | 1,6-diaminohexane | 6X HCl | 270 |
| C2 | 1,6-diaminohexane | NH$_4$Cl | 270 |
| C3 | 1,6-diaminohexane | HClO | 270 |
| C4 | 1,6-diaminohexane | KCl | 270 |
| C5 | 1,6-diaminohexane | NaCl | 270 |
| C6 | 1,6-diaminohexane | HBr | 270 |
| C7 | 1,6-diaminohexane | KBr | 270 |
| C8 | 1,6-diaminohexane | HI | 270 |
| C9 | 1,6-diaminohexane | KI | 270 |

2. Antibacterial Test of Carbon Quantum Dots

The minimum inhibitory concentration (MIC) value of a carbon quantum dot was determined by a standard dilution method in a variety of tested bacterial strains, including *E. coli* (*Escherichia coli*), *P. aeruginosa* (*Pseudomonas aeruginosa*), *S. enteritidis* (*Salmonella enterica*), *S. aureus* (*Staphylococcus aureus*), MRSA (Methicillin-resistant *Staphylococcus aureus*, a multi-drug resistant *Staphylococcus*), *S. iniae* (*Streptococcus* iniae), and *C. albicans* (*Candida albicans*).

Growth and Determination of Bacteria

A single colony of each strain was removed from the culture medium, and inoculated in each suitable growth medium (10 mL). The cultured bacteria were grown at 37° C. with shaking (200 rpm), until the absorbance at 600 nm (O.D. 600) reaches 1.0 (optical path length: 1.0 cm). Each cell mixture was centrifuged at 1.0 mL (RCF 3,000×g, 10 mM, 25° C.), and washed twice with 5 mM sodium phosphate buffer (pH 7.4) before further use. The carbon quantum dots were mixed with a $10^5$ CFU/mL bacterial solution, and the final concentration of the reaction bacterial solution was $10^4$ CFU/mL. After reaction for 3 hours, each suitable growth medium was added. After 12 hours of incubation in the incubator at the culture temperature of each strain, the absorbance at 600 nm (O.D. 600) was measured.

In one embodiment, the differences in the antibacterial effect of the carbon quantum dots A0 to I0 and the corresponding halogen-containing carbon quantum dots A1 to I1 in Table 3 were detected. The results are shown in FIG. 1. FIG. 1 shows that the carbon quantum dots made of mixed chlorine compounds as precursors obviously had better antibacterial ability.

In some embodiments, the compound of formula (I) and halogen were mixed at different molar ratios of 1:0.5, 1:1, 1:2, 1:4 or 1:6 to form precursors, and they were prepared separately as the carbon quantum dots with different halogen contents. Then, the weight percentages of the halogens in the compositions of the carbon quantum dots were analyzed. Table 4 shows the detection of 1,6-hexanediamine (compound C of formula (I) in Table 1) and hydrogen chloride in different proportions as precursors to prepare carbon quantum dots, like C1-0.5, C1, C1-2, C1-4 and C1-6 in Table 3, wherein weight percentages of chlorine in the entire carbon quantum dot compositions were shown in Table 4. It can be seen that the more halogen compounds added to the precursor, the more halogens will be contained in the final structures of carbon quantum dots.

TABLE 4

Weight percentage of chlorine in the structure of the chlorine-containing carbon quantum dot derivatives of 1,6-hexane diamine
Elemental composition (mass ratio)

| Code of carbon quantum dot | Chlorine (%) |
|---|---|
| C0 | N/A |
| C1-0.5 | 18.24 |
| C1 | 28.68 |
| C1-2 | 27.54 |
| C1-4 | 35.07 |
| C1-6 | 37.40 |

Figure 2:
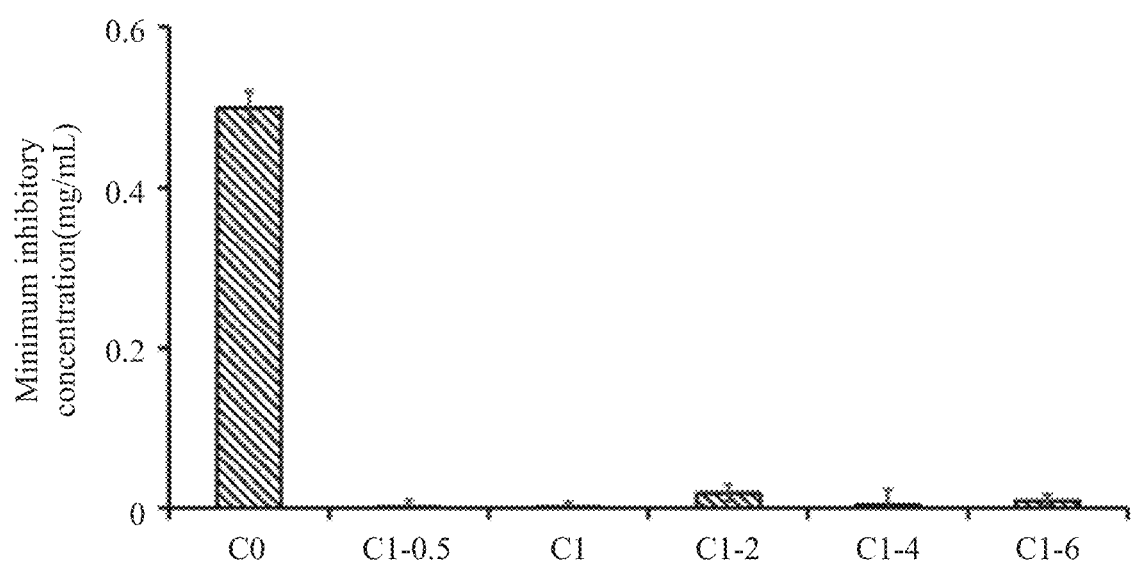
FIG. 2 is a schematic diagram showing the differences in the detected inhibitory effect on *Escherichia coli* (*E. coli*) of carbon quantum dot derivatives of 1,6-hexanediamine with different chlorine contents in the structure.

In some embodiments, the antibacterial effects of carbon quantum dots with different chlorine contents in the structures were tested. FIG. 2 is a schematic diagram of the detection of the differences in the inhibitory effect on *E. coli* (*Escherichia coli*) by carbon quantum dot derivatives having different chlorine contents in the structures, as prepared by 1,6-hexanediamine (compound C of formula (I) listed in Table 1) and different ratios of hydrogen chloride as precursors. FIG. 2 shows that as long as the final carbon quantum dot structure had a certain amount of halogen, the ability to inhibit the growth of bacteria can bring about unexpected and notable progress.

Figure 3:
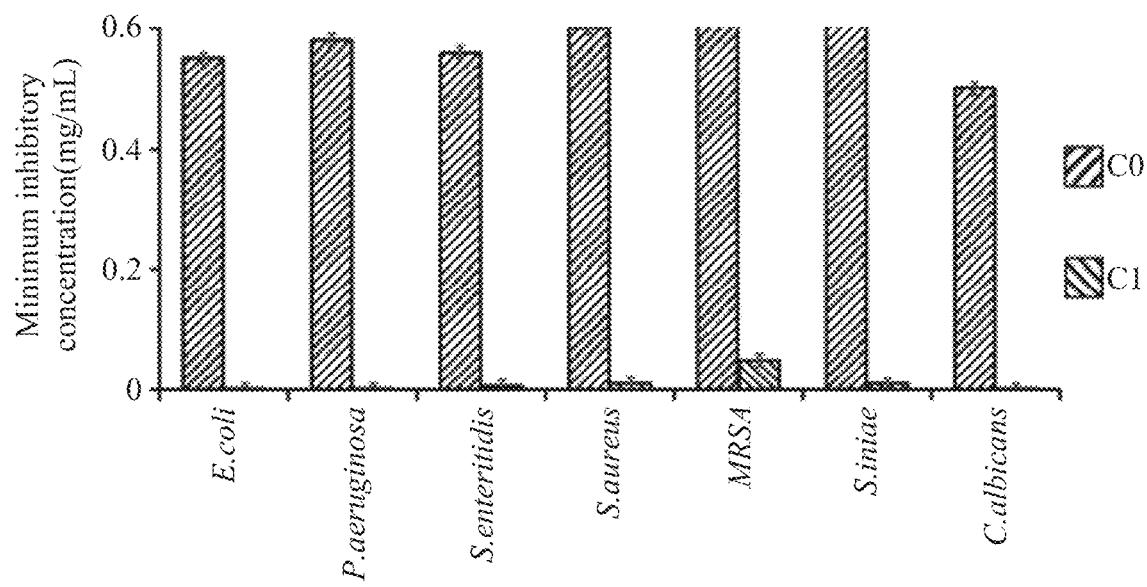
FIG. 3 shows the efficacy data of the detection of the chlorine-containing carbon quantum dot derivatives of 1,6-hexanediamine on the inhibition of different bacterial strains.

In some embodiments, the following seven strains were used: *E. coli* (*Escherichia coli*), *P. aeruginosa* (*Pseudomonas aeruginosa*), *S. enteritidis* (*Salmonella enterica*), *S. aureus* (*Staphylococcus aureus*), MRSA (Methicillin-resistant *Staphylococcus aureus*, a multi-drug resistant *Staphylococcus*), *S. iniae* (*Streptococcus iniae*), and *C. albicans* (*Candida albicans*), and the data for testing the antibacterial effect of carbon quantum dot derivatives were shown in FIG. 3. FIG. 3 shows the efficacy data of the detection of carbon quantum dots with 1,6-hexanediamine as the precursor (C0 carbon quantum dot in Table 3) and the corresponding chlorine-containing carbon quantum dots (C1 carbon quantum dot in Table 3) for different strains. FIG. 3 shows that the halogen-containing C1 carbon quantum dot had a significantly better effect on the antibacterial ability of the above-mentioned bacteria than the halogen-free C0 carbon quantum dot in the composition.

Figure 4:
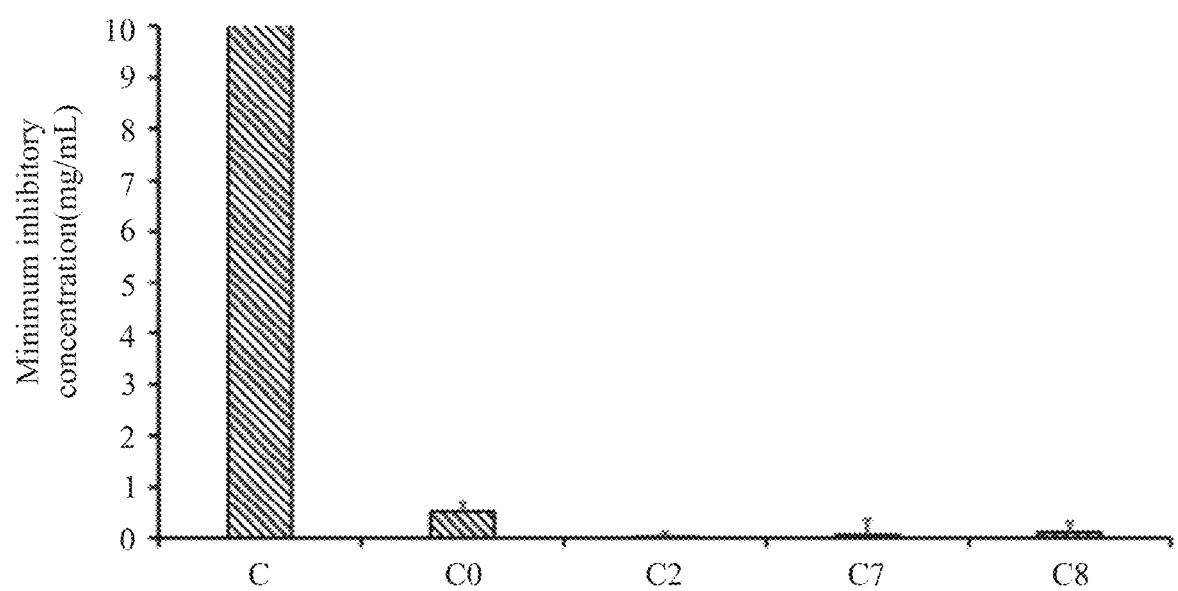
FIG. 4 is a schematic diagram showing detection of the antibacterial ability of three halogen-containing carbon quantum dot derivatives of 1,6-hexanediamine.
Figure 5A:
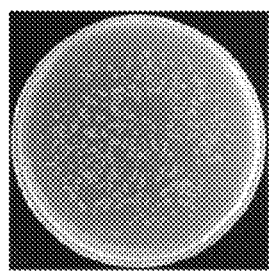
FIGS. 5A to 5D are diagrams of plating for detecting the antibacterial ability of three halogen-containing carbon quantum dot derivatives of 1,6-hexanediamine.
Figure 5B:
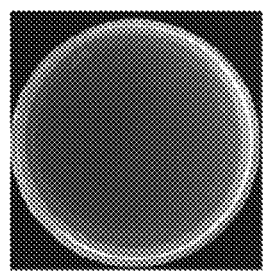
Figure 5C:
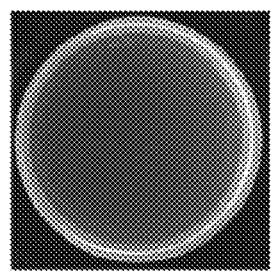
Figure 5D:
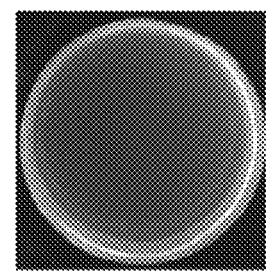

In some embodiments, the antibacterial ability of the carbon quantum dots of the compounds of formula (I) containing different halogens against *E. coli* was tested respectively, and the results were shown in FIG. 4. FIG. 4 is a schematic diagram of detecting the antibacterial ability of the carbon quantum dots prepared with 1,6-hexanediamine (compound C of formula (I) in Table 1) and three halogen-containing compounds (Table 2) as precursors. FIG. 4 shows that the uncarbonized compound of formula (I) had the worst antibacterial effect. As compared with the uncarbonized compound, the carbon quantum dot of the compound of formula (I) (C0 carbon quantum dot in Table 3) had a better antibacterial ability. The carbon quantum dots of the compounds of formula (I) containing halogens (C2, C7 and C8 carbon quantum dots in Table 3), such as chlorine, bromine or iodine, in the structure can increase the antibacterial ability by more than 10 folds.

In some embodiments, the antibacterial abilities of the carbon quantum dots of the compounds of formula (I) containing different halogens on *E. coli* were detected, respectively, and the results of the colony growth effect after plating were shown in FIGS. 5A to 5D. FIGS. 5A to 5D show the effect of antibacterial abilities by plating of the halogen-free C0 carbon quantum dot and the halogen-containing C3, C6 and C9 carbon quantum dots in Table 3. FIGS. 5A to 5D show that the carbon quantum dots containing halogens, like chlorine, bromine or iodine, in the structure bring about an unexpected, significant antibacterial effect over the same type of carbon quantum dots free from containing halogens.

Figure 6A:
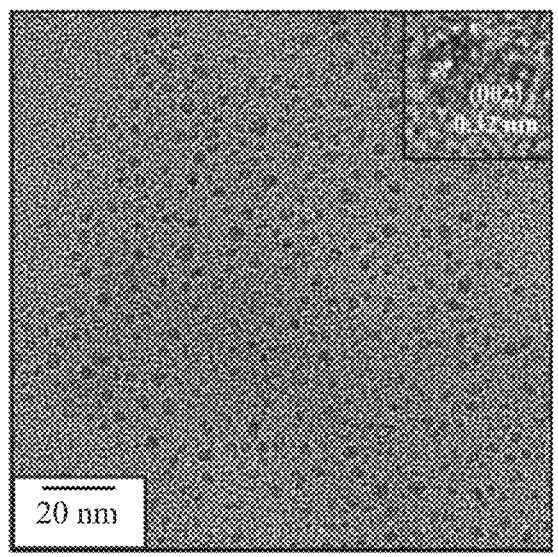
FIGS. 6A and 6B show the results of a high-resolution electron microscopy (HR-TEM) analysis of the chlorine-containing carbon quantum dot derivatives of 1,6-hexanediamine (FIG. 6A) and the chlorine-containing carbon quantum dot derivatives of spermidine (FIG. 6B).
Figure 6B:
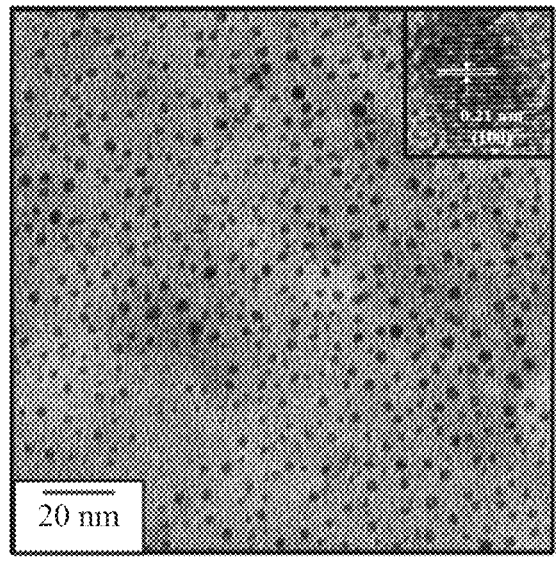

In some embodiments, the structure of the carbon quantum dot of the compound of formula (I) containing halogen was analyzed by a high-resolution transmission electron microscopy (HR-TEM). FIG. 6A shows the C1 carbon quantum dot listed in Table 3, and FIG. 6B shows the E1 carbon quantum dot listed in Table 3. These central parts of the carbon quantum dots of the compounds of formula (I) containing halogen had (002) and (100) graphite lattice planes, showing that the common structural feature is the graphite core of carbon quantum dots of formula (I) compounds containing halogen.

Figure 7A:
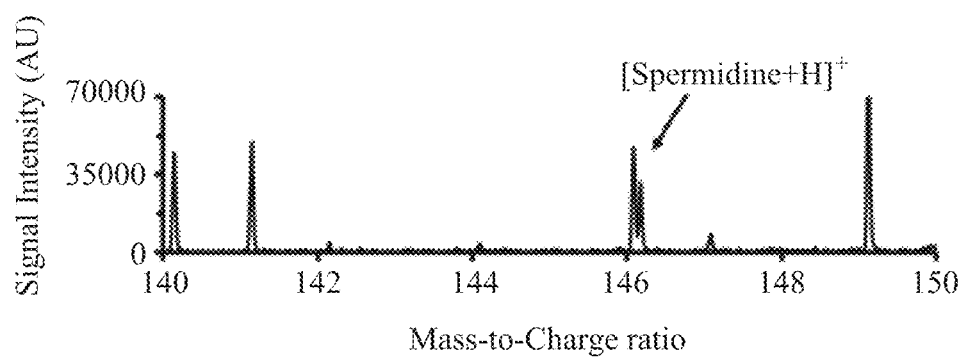
FIGS. 7A and 7B are the detection results of the structural composition using laser desorption/ionization mass spectrometry to analyze the surfaces of the chlorine-containing carbon quantum dot derivatives of spermidine (FIG. 7A) and the chlorine-containing carbon quantum dot derivatives of 1,6-hexanediamine (FIG. 7B).
Figure 7B:
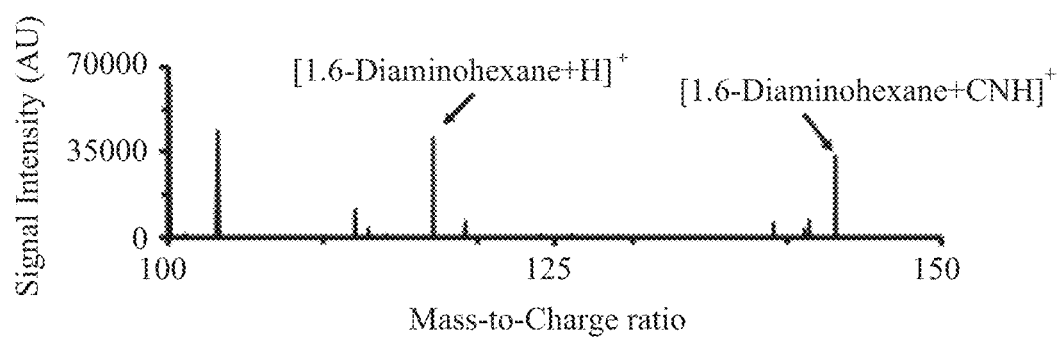

In some embodiments, laser desorption/ionization mass spectrometry (LDI-MS) was used to analyze the structure of the carbon quantum dots of the compounds of formula (I) containing halogen. The surface of the carbon quantum dot was impinged with laser, which may cause the surface functional groups to be freed, and thereby generating a mass spectrometry signal. FIG. 7A shows the C1 carbon quantum dot in Table 3, and FIG. 7B shows the analysis result of the E1 chlorine-containing carbon quantum dot in Table 3. Compound C and compound E can be freed by laser from the C1 and E1 carbon quantum dots, respectively, showing that the compounds of formula (I) polymerized on the surface is a common technical feature of carbon quantum dots of the compounds of formula (I) containing halogen.

In some embodiments, a dynamic light scattering/Zeta potential analyzer (DLS & zeta potential), an elemental analyzer, and an inductively coupled plasma mass spectrometer (ICP-MS) were used to analyze the structures of the compounds of formula (I) and the structures of the carbon quantum dots prepared by using the compounds of formula (I) as the precursor alone or by mixing the compound of formula (I) with the halogen-containing compounds as the precursors. Table 5 below shows the comparison results of the particle size, potential and the elemental content (oxygen, nitrogen, carbon, hydrogen, and halogen) in the component of uncarbonized compound C of formula (I), halogen-free C0 carbon quantum dot, and C1, C6, and C8 carbon quantum dots containing chlorine, bromine, and iodine, respectively. It can be observed that the structural components of the three halogen-containing carbon quantum dots (C1, C6, and C8) of compound C of formula (I) all carry halogen atoms as precursors, and the surface of the structures each has a net positive charge.

The embodiments described in this application include the product or process that a member of the group is exhibited in, is used in, or is related to. The numerous embodiments contained in the present application include more than one or all of the group members exhibited in, used in, or related to the product or process.

In addition, it should be noted that the present application relates to carbon quantum dots of the halogen-containing compounds of formula (I) prepared by using the compounds of formula (I) and the halogen compounds as precursors, and the synthesis precursors, halogen sources, synthesis methods, and the final structure and characteristics of the carbon

TABLE 5

Particle size, potential, and content of elements (oxygen, nitrogen, carbon, hydrogen, and halogen) in the structure of three halogen-containing polyamine carbon quantum dot derivatives of 1,6-hexanediamine

| | Diameter (nm; n = 5) | Zeta potential (mV; n = 5) | Oxygen (%) | Nitrogen (%) | Hydrogen (%) | Carbon (%) | Halogen (%) |
|---|---|---|---|---|---|---|---|
| C | N/A | N/A | N/A | 24.2 | 62.3 | 13.5 | N/A |
| C0 | 3.9 ± 1.2 | 37.4 ± 1.5 | 15.9 | 20.7 | 50.1 | 13.5 | N/A |
| C1 | 2.3 ± 0.6 | 43.2 ± 1.7 | 5.3 | 15.8 | 39.1 | 10.7 | 29.1 |
| C6 | 2.4 ± 0.7 | 45.2 ± 2.7 | 4.9 | 13.6 | 35.4 | 9.5 | 36.6 |
| C8 | 5.5 ± 1.7 | 42.4 ± 3.7 | 5.4 | 14.2 | 44.6 | 10.6 | 25.2 |

In some embodiments, the carbon quantum dots of the compounds of formula (I) containing halogen were applied to the anti-infective effects of animals, and grouper farming was taken as an example herein. One mg of a halogen-containing C1 carbon quantum dot in Table 3 was added to 1 kg of feed, and mixed evenly for feeding two-inch grouper fry. After feeding for 7 consecutive days, a challenge test (the challenge strain was *Vibrio campbellii* (*V. campbellii*)) was performed. The grouper was soaked in $10^6$ CFU/mL *V. campbellii* for 1 hour and 30 minutes, before moving to normal environment to observe the survival rate thereof. Table 6 shows the results of three independent experiments, confirming that feeding the carbon quantum dots of the compounds of formula (I) containing halogen have no effect on the health of grouper, and also effectively increase the survival rate of grouper by 1.5 to 4 folds under severe bacterial infection.

quantum dots are different from those of the prior art. It is also found from the examples of the present application that containing halogens in the structures of the carbon quantum dots of the compounds of formula (I) brings about an unexpected, significantly enhanced antibacterial effect. In addition, compared with the previous antibacterial carbon quantum dots, the carbon quantum dots of the present application have been proven to have various unexpected, significant advantages, including better antibacterial ability that can be applied to the disease prevention and treatment of sea grouper and can be used against the fungus *Candida albicans*, etc. In some embodiments, the chlorine-containing carbon quantum dot of 1,6-hexanediamine (compound C of formula (I) in Table 1) (C1 carbon quantum dot in Table 3) has a minimum inhibitory concentration as low as 0.0001 mg/mL in *E. coli*.

TABLE 6

The results of an animal efficacy test of the chlorine-containing carbon quantum dot derivatives of 1,6-hexanediamine

| Survival rate (%) | Control group | C1 |
|---|---|---|
| First-batch Test | 20 | 80 |
| Second-batch Test | 58 | 83 |
| Third-batch Test | 40 | 85 |

Figure 8:
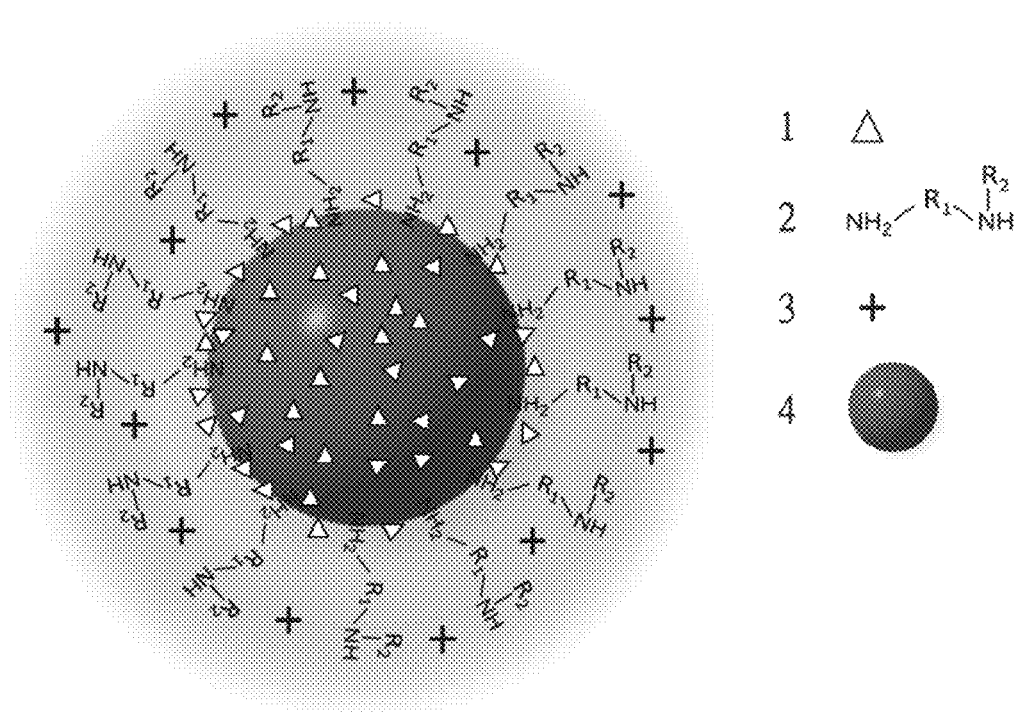
FIG. 8 is a structural diagram of the carbon quantum dots of the present application.

FIG. 8 is a schematic diagram of the structure of the carbon quantum dot of the present application, which is a reaction product derived from a compound of formula (I) and a halide ion compound after a pyrolysis treatment:

A person having ordinary skill in the art will use no more than conventional experiments to identify or ascertain many equivalent embodiments of the present disclosure. The (protection) scope of the present application is not limited to the embodiments disclosed, but also includes all the embodiments fallen within the scope of the appended claims. In addition, it can be understood that the equipment, conditions or materials can be modified as suitable for the teaching of the present application, without departing from the scope thereof.

What is claimed is:

1. A carbon quantum dot comprising a reaction product derived from a compound of formula (I) and a halide ion compound after a pyrolysis treatment:

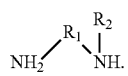

(I)

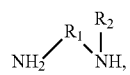

(I)

The reaction product comprises a graphite core and a surface having a compound of formula (I) and a halogen, and the surface has a positive charge.

wherein the reaction product comprises a graphite core and a surface having a compound of formula (I) and a halogen, and the surface has a positive charge, wherein $R_1$ in the compound of formula (I) is selected from the group consisting of $C_{2-8}$ alkyl, $[CH_2]_4$—NH—$[CH_2]_3$, $[CH_2]_3$—NH—$[CH_2]_4$—NH—$[CH_2]_3$, $[CH_2]_4$—CH—COOH, $CH_2$—CHOH—$[CH_2]_2$—CH—COOH, and $[CH_2]_2$—S—$CH_2$—CH—COOH, and $R_2$ is H; and wherein the halogen has a weight percentage of between 15% and 40% in the carbon quantum dot.

2. The carbon quantum dot according to claim 1, wherein the halogen is derived from a chlorine compound, a bromine compound, or an iodine compound.

3. The carbon quantum dot according to claim 2, wherein the chlorine compound is hydrogen chloride, ammonium chloride, hypochlorous acid, potassium chloride, or sodium chloride.

4. The carbon quantum dot according to claim 2, wherein the bromine compound is hydrogen bromide or potassium bromide.

5. The carbon quantum dot according to claim 2, wherein the iodine compound is hydrogen iodide or potassium iodide.

6. A method for preparing the carbon quantum dot according to claim 1, comprising:

mixing the compound of formula (I) with the halide ion compound to form a mixture:

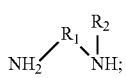

(I)

and pyrolyzing the mixture at a temperature to obtain the carbon quantum dot.

7. The method according to claim 6, wherein the temperature is between 150° C. and 300° C.

8. The method according to claim 7, wherein the temperature is between 150° C. and 180° C., between 180° C. and 210° C., between 210° C. and 240° C., between 240° C. and 270° C., or between 270° C. and 300° C.

9. An antibacterial composition comprising the carbon quantum dot according to claim 1 and a pharmaceutically acceptable carrier thereof.

10. The antibacterial composition according to claim 9, wherein the halogen has a weight percentage of between 15% and 40% in the antibacterial composition.

11. The antibacterial composition according to claim 9, wherein the carbon quantum dot has a diameter of from 1 nm to 8 nm.

12. The antibacterial composition according to claim 9, wherein the carbon quantum dot has a positive surface charge of from 38 mV to 48 mV zeta potential.

13. A method for treating an infective condition or disease, comprising administering an effective amount of the carbon quantum dot according to claim 1 to a subject in need thereof.

14. The method according to claim 13, wherein the infective condition or disease is caused by proliferation of a microorganism selected from the group consisting of a non-multidrug resistant bacterium, a drug resistant bacterium and a multidrug resistant bacterium.

15. The method according to claim 14, wherein the non-multidrug resistant bacterium is selected from the group consisting of *E. coli, P. aeruginosa, S. enterica, S. aureus, S. inus*, and *C. albicans*.

16. The method according to claim 14, wherein the multidrug resistant bacterium is drug-resistant *Staphylococcus*.

* * * * *